Figure 1:
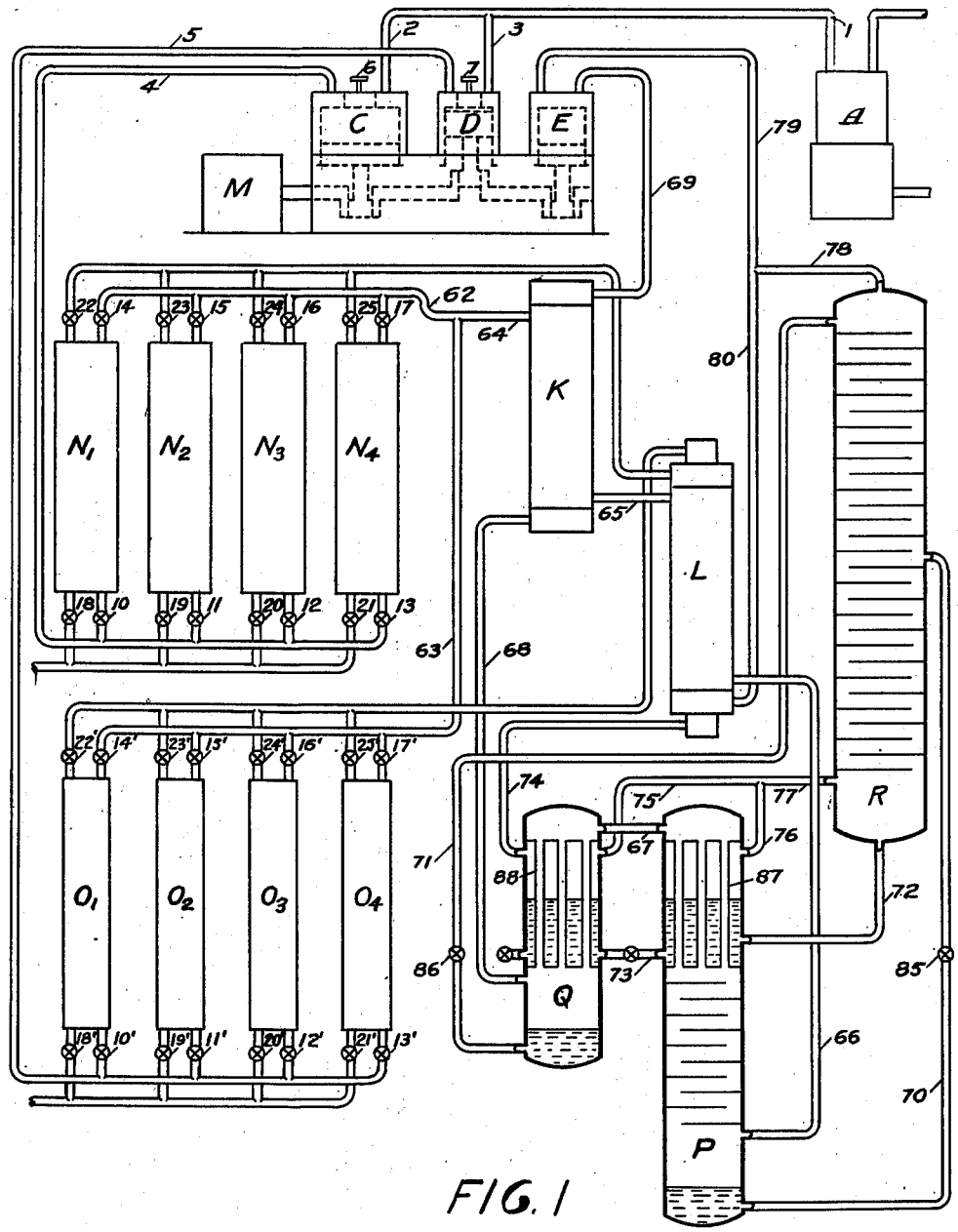

Patented Jan. 11, 1938

2,105,214

UNITED STATES PATENT OFFICE 2,105,214

METHOD AND APPARATUS FOR COOLING AND RECTIFYING GASEOUS MIXTURES

William Lane De Baufre, Lincoln, Nebr.

Application October 11, 1935, Serial No. 44,616

27 Claims. (Cl. 62—175.5)

This invention relates to the art of separating mixed gases by cooling and rectification and is particularly applicable to the liquefaction and separation of atmospheric air.

The utilization of the "principle of regeneration" in combination with the "throttling effect" of Joule-Thomson enabled Linde in Germany, Dewar in England and Tripler in the United States to produce liquid air in quantity about the end of the 19th century. In the art of air liquefaction, this "principle of regeneration" has been credited to William Siemens who applied it to a number of industrial processes about the middle of the 19th century, although the idea originated with Robert Stirling some years earlier. The "principle of regeneration" is utilized in every air separation plant today whether a throttle valve or an engine is employed for expanding the compressed air to be rectified into more or less pure oxygen and nitrogen.

As utilized in air liquefaction and rectification, the principle of regeneration has generally been realized by means of interchangers in which the compressed air is cooled by heat transfer through intervening surfaces to air or oxygen and nitrogen returning at very low temperatures after expansion and partial liquefaction or rectification. This has been done in spite of the recognized advantage of recuperators as originally proposed by Stirling and employed by Siemens in regenerative processes wherein masses of material absorb heat from the fluid to be cooled and then give up this heat to the fluid to be warmed. In recuperators, impurities deposited by condensation or sublimation during cooling are more or less re-evaporated during heating. If the re-evaporation were complete, there would be no need (so far as the recuperators are concerned) to remove carbon dioxide and water vapor by chemical means from compressed air to be cooled in air separation plants employing recuperators.

The reason for preferring interchangers to recuperators in applying the principle of regeneration to cooling and rectifying atmospheric air, is that recuperators have certain disadvantages in air separation plants. The general object of the present invention is to remedy these disadvantages and thus overcome the objection to recuperators for this purpose. Certain features, however, are applicable to air separation plants employing interchangers instead of recuperators.

One of the disadvantages when employing two sets of recuperators and dividing the air into two portions to warm separately the oxygen and nitrogen returning from the rectifier in an air separation plant, is the resulting lack of proportion between the capacities of the returning oxygen and nitrogen to absorb heat and that of the two portions of air to give up heat. One object of the present invention is to insure proper proportioning of the air to be cooled between two such sets of recuperators.

Another inherent disadvantage of recuperators is that the same space within the recuperator is first filled with high pressure air and then with low pressure oxygen or nitrogen, thereby resulting in a reduction of the purity of the oxygen or nitrogen by mixture with a residue of compressed air. One object of the present invention is to reduce contamination of the product of rectification and even to eliminate this contamination. An incidental object of the invention is to facilitate the change from high to low pressure.

Other disadvantages attending the use of recuperators include accumulation of impurities deposited during cooling but not removed during warming, fluctuations in temperature of the compressed air leaving the recuperators and large pressure drops in returning products of rectification or excessive size of recuperators. Other objects of the present invention are to reduce these disadvantages.

If recuperators are employed in an air separation plant and chemical purification of the air is omitted, carbon dioxide will not only be deposited within the recuperators but will also be carried through them and be subsequently deposited in the engine or turbine required for refrigeration purposes. One object of the present invention is to so arrange an air separation plant with recuperators that this will not occur.

Another object of the present invention is to take advantage of dividing compressed air in two portions to an air separation plant with recuperators or interchangers by supplying the two portions at different pressures, thereby obtaining a better adaptation of pressure of the compressed air to the different requirements of the process.

Figure 2:
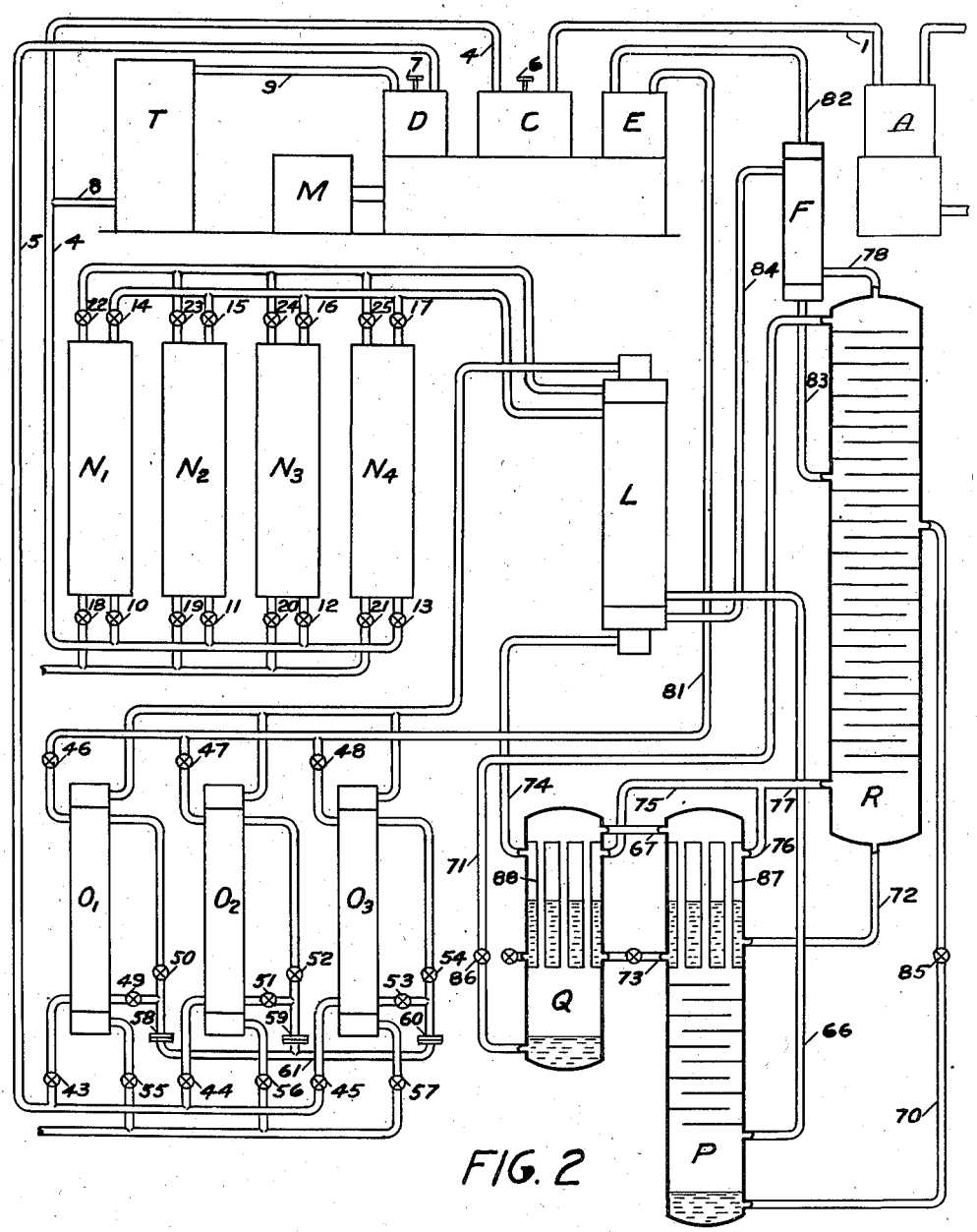
Figure 3:
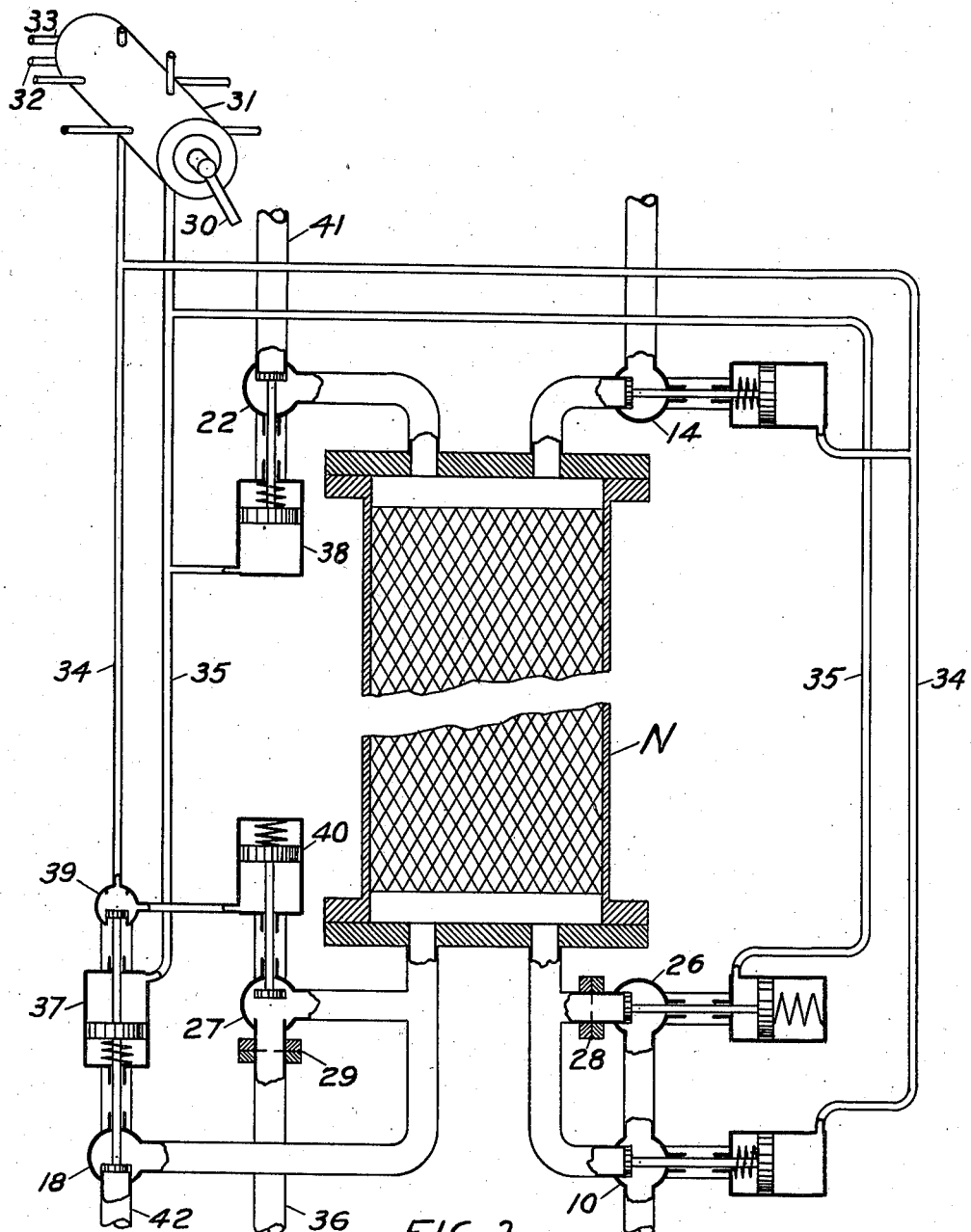

The foregoing objects, together with such additional and subsidiary advantages as may hereinafter appear or are incident to the invention, are realized by means of the apparatus illustrated in preferred form in the accompanying drawings wherein Fig. 1 shows recuperators for both returning oxygen and returning nitrogen while Fig. 2 shows recuperators for returning nitrogen only and interchangers for returning oxygen in applying the principle of regeneration to air separation plants. Details of arrangement of the valves for the recuperators are shown in Fig. 3.

The apparatus shown in Fig. 1 and Fig. 2 includes:

(1) Recuperators $N_1$, $N_2$, $N_3$ and $N_4$ for cooling one portion of the compressed air by heat exchange with the returning nitrogen product of rectification.

(2) Recuperators $O_1$, $O_2$, $O_3$ and $O_4$, Fig. 1 or interchangers $O_1$, $O_2$ and $O_3$, Fig. 2, for cooling another portion of the compressed air by heat exchange with the returning oxygen product of rectification.

(3) Positive displacement compressors C and D driven by motor M for supplying to the two sets of regenerators (recuperators or interchangers) two measured portions of compressed air from compressor A.

(4) Absorption tower T for removing carbon dioxide from one portion only of the compressed air.

(5) Expansion engine (or turbine) E for expanding a portion of the compressed air either before or after rectification.

(6) Interchanger K, Fig. 1, for further cooling both portions of compressed air by heat exchange with the portion of compressed air to be expanded.

(7) Interchanger F, Fig. 2, for cooling the expanded portion of compressed air by heat exchange with the nitrogen product of rectification.

(8) Liquefier L for partly liquefying the compressed air by heat exchange with products of rectification.

(9) Preliminary rectifier P with auxiliary vaporizer Q for a preliminary rectification of the compressed air into nitrogen-rich and oxygen-rich components.

(10) Main rectifier R for completing the rectification of the air to be separated.

The operation of the above listed equipment will be described for separation of atmospheric air into more or less pure oxygen and nitrogen, for which the apparatus shown on the drawings is specially adapted. Various features, however, would be useful for separating other gaseous mixtures than atmospheric air.

The atmospheric air to be separated is first compressed in compressor A to some suitable pressure such as 75 lbs. gage and then supplied through compressed air main 1. A measured quantity of this compressed air is withdrawn from main 1 and divided into two measured portions by positive displacement compressors C and D.

In Fig. 1, the two compressors C and D are connected in parallel by pipes 2 and 3 to main 1 and withdraw two measured portions of compressed air therefrom. The two measured portions are discharged by compressors C and D through pipes 4 and 5 to the two sets of recuperators N and O for warming the returning nitrogen and oxygen respectively. Irrespective of differences in frictional resistances through the two sets of recuperators due to differences in construction or to accumulation of impurities therein during operation, the ratio of the two portions of compressed air withdrawn from main 1 is maintained substantially constant by means of compressors C and D. Thus, each positive displacement compressor raises the pressure of the compressed air withdrawn from main 1 until the pressure is sufficient to overcome the frictional resistance opposed to its flow through the recuperators. If the compressed air is divided between the two sets of recuperators in proportion to the cooling effects of the returning nitrogen and oxygen, this proportion will be maintained by the positive displacement compressors in parallel irrespective of changes in operating conditions. Should the proportioning not be as desired, the ratio between the two portions of compressed air may be changed while the compressors are in operation by adjusting valves 6 and 7 controlling clearance pockets in the two compressors respectively.

In Fig. 2, a similar result is obtained by means of two positive displacement compressors in series rather than in parallel. Compressor C withdraws from main 1 a measured quantity of compressed air which is to be separated into oxygen and nitrogen. This measured quantity is discharged through pipe 4. A measured portion of this quantity is withdrawn from pipe 4 by compressor D through pipe 8, carbon dioxide absorption tower T and pipe 9. This measured portion is further compressed by compressor D and discharged through pipe 5 to regenerators O for warming the returning oxygen. The remaining portion of the quantity of compressed air withdrawn from main 1 flows through pipe 4 to regenerators N for warming the returning nitrogen. By adjustment of valves 6 and 7, the proportion of the two portions of compressed air to the cooling effects of the returning oxygen and nitrogen may be changed while the compressors are in operation by varying clearance pockets within the compressors. The two compressors in series in Fig. 2 maintains a nearly constant ratio of the two portions of compressed air supplied to the two sets of regenerators (whether of the recuperative or interchanger type) irrespective of frictional resistances to flow. There is also obtained a variation in this ratio for the purpose of adjusting the refrigeration supplied to the requirements of the process as will be explained later.

There is thus utilized in this invention the idea embodied in Patent Application Serial No. 35,351 filed August 5, 1935, for proportioning the supply of compressed air to two or more air separation plants, except that in the present case the proportioning is to separate sets of regenerators in a single air separation plant.

Four recuperators are shown connected in parallel to warm the returning nitrogen and cool a corresponding portion of compressed air. Three and preferably four or more recuperators in parallel are proposed instead of two only as theoretically required for continuous flow of compressed air and returning nitrogen. Assume that normal operating conditions have been reached with valves 10 and 14 open and with valves 18 and 22 closed. Compressed air is then flowing through recuperator $N_1$ and is being cooled to a low temperature by giving up heat to the previously cooled mass of material therein. While the compressed air is being cooled within one recuperator $N_1$, it is proposed to warm the returning nitrogen within two or more recuperators $N_2$ and $N_3$ and possibly $N_4$, valves 19, 20, 21, 23, 24 and 25 being open and valves 11, 12, 13, 15, 16, and 17 closed. By so doing, a number of advantages result.

Thus, with approximately the same mass flows of a portion of the compressed air and the returning nitrogen alternately through a single recuperator, as would be the case with two recuperators only, the pressure drop would be less for the more dense fluid in inverse proportion to the two densities. A greater pressure drop is permissible, however, for the compressed air being cooled than for the returning nitrogen being warmed because the latter affects the performance of the rectifier while the former simply increases the power of compression somewhat.

Also, with approximately the same mass flows of compressed air and returning nitrogen, the volume flow of the latter would be greater than that of the former in inverse proportion to the two densities. It is desirable to have a low velocity of returning nitrogen in order to re-evaporate more nearly completely impurities deposited from the compressed air. A low velocity of compressed air is not necessary. Thus, as impurities are deposited by the compressed air, obstructions to flow are built up more or less non-uniformly. More air then flows through the less obstructed places, thereby increasing the rate of deposition in the less obstructed places and decreasing the rate in the more obstructed places. Deposits thus tend to become uniformly distributed as they are deposited even with high velocities of the compressed air. With the returning nitrogen, however, the flow is greater through less obstructed places, thereby re-evaporating more material where deposits are light than where they are heavy. Deposits thus tend to become less uniform as they are re-evaporated and accumulated deposits remain in spots even after the period of re-evaporation is over. This tendency for deposits to accumulate through a number of cycles of operation is reduced by lowering the velocity of the returning nitrogen.

With two recuperators only, a sufficiently low velocity of returning nitrogen would be obtained only with a still lower velocity of compressed air. But by using two or three or more recuperators in parallel for returning nitrogen with the corresponding portion of compressed air flowing through one recuperator only, the permissible higher velocity of compressed air may be reached without exceeding the desired low velocity of returning nitrogen. This arrangement also provides a length of time for re-evaporation of deposits two or three or more times longer than the period of their deposition, thereby reducing the tendency for deposits to accumulate through a number of cycles of operation.

Looked at in another way, recuperators must be sufficiently large in cross-section to give a low pressure drop for returning nitrogen. If two recuperators only are provided, the total cross-sectional area must be twice that required for returning nitrogen. But if three recuperators are provided, two for returning nitrogen and one for compressed air, the total cross-sectional area is only one-half greater than required for returning nitrogen. And if four recuperators are provided, the total cross-sectional area is only one-third greater than necessary for returning nitrogen. Thus, by employing three or more recuperators for returning nitrogen, there is a considerable saving in material and equipment for satisfactory operation.

In changing from compressed air to nitrogen or the reverse, at least three recuperators are also desirable in order that this change may be made gradually. With two recuperators only in parallel, the flows must be reversed suddenly in order not to interrupt either the flow of compressed air or of nitrogen through the recuperators for an appreciable length of time. With at least one additional recuperator, the flow can be gradually changed in one recuperator without interrupting the flow of either compressed air or of nitrogen through the remaining two or more recuperators. An arrangement of valves suitable for accomplishing a gradual change in pressure when changing over a recuperator, is described and claimed in patent application Serial No. 10,955 filed March 13, 1935. By means of a modification in this arrangement as shown in Fig. 3, contamination of the product of rectification may be reduced.

Referring to Fig. 3, valves 10, 14, 18 and 22 correspond to the valves of the same numbers in Fig. 1 and Fig. 2. Valves 26 and 27 are auxiliary valves for controlling flows of compressed air and returning nitrogen through orificies 28 and 29 respectively. All valves are shown in the positions corresponding to the period of changing over from flow of compressed air through valves 10 and 14 to flow of returning nitrogen through valves 22 and 18. By movement of handle 30 of control valve 31, pressure and exhaust tubes 32 and 33 have been connected to tubes 34 and 35 respectively, thereby closing valves 10 and 14, opening valve 27, permitting valve 26 to be closed by spring pressure, and relieving the pressure to hold valves 18 and 22 closed. Valves 18 and 22 will not immediately open, however, by reason of compressed air pressure within recuperator N holding these valves to their seats.

With valve 27 open, the high pressure of compressed air within recuperator N will be gradually reduced by restricted flow of the compressed air through orifice 29, the compressed air flowing through pipe 36 to waste or to a place where it is recovered. When the pressure within recuperator N becomes reduced to a low value, valves 18 and 22 will be opened by the action of the springs within cylinders 37 and 38. As soon as the piston within cylinder 37 moves upward, valve 39, which was open to admit the operating fluid pressure into cylinder 40 to open valve 29, will shut off the operating fluid pressure and relieve the pressure within cylinder 40 by connecting it to the atmosphere (or to exhaust tube 35).

By providing a heavier spring within cylinder 38 than within cylinder 37, valve 22 will open before valve 18, thereby flushing out recuperator N with returning nitrogen which is wasted through valve 27 before recovery of the returning nitrogen starts by flow through valve 18. It should be mentioned that a certain amount of flexibility is required in the connections to permit the two valves 18 and 39 to be both closed by the same operating piston within cylinder 37.

When valves 18 and 22 open and valve 27 closes, flow of the returning nitrogen will be established into pipe 41, through recuperator N and out of pipe 42. This returning nitrogen will be contaminated by the residue of compressed air remaining in recuperator N when valve 27 closes, but the contamination will be much less than if no compressed air had been discharged through orifice 29. Otherwise, the operation of the various valves in Fig. 3 is essentially the same as described in patent application Serial No. 10,955, filed March 13, 1935. Control valve 31 in Fig. 3 may be utilized to control the operation of all valves on all regenerators, for returning oxygen as well as for returning nitrogen, and this control may be made automatic by driving control valve 31 with an electric motor as claimed in the above mentioned application.

The valves on the recuperators for returning oxygen in Fig. 1 have been given the same numbers with primes as for returning nitrogen so that the above description applies to the oxygen recuperators as well as to the nitrogen recuperators. Generally, a reduction in contamination of returning oxygen would be more important than of returning nitrogen so that the above described arrangement of valves for reducing contamination may be applied to oxygen recuperators only.

Contamination of one of the products of rectification may be eliminated entirely by employing interchangers as regenerators for that product while using recuperators as regenerators for the other product which is wasted or not desired in as pure a state as attained by rectification. Such an arrangement is shown in Fig. 2.

Three interchangers $O_1$, $O_2$ and $O_3$, are shown in Fig. 2 for returning oxygen. The portion of the compressed air to be cooled in these interchangers is supplied by positive displacement compressor D through pipe 5. With valves 43 and 50 open and valves 46 and 49 closed, this measured portion of compressed air flows up through interchanger $O_1$ and thence to manifold 61. From manifold 61, the compressed air flows up through interchangers $O_2$ and $O_3$ in parallel, valves 47, 48, 51 and 53 being open and valves 44, 45, 52 and 54 being closed. With valves 56 and 57 open and valve 55 closed, returning oxygen flows down through interchangers $O_2$ and $O_3$ in parallel but does not flow through interchanger $O_1$.

This arrangement of multiple interchangers has many of the advantages described and claimed in patent application Serial No. 742,869 filed September 5, 1934, now matured into Patent No. 2,039,889, issued May 5, 1936. The drawings show how to attain these advantages when the compressed air flows up through all interchangers, both when defrosting and when being cooled by a returning product of rectification. Manifold 61, which has valved connections to both ends of each interchanger, enables this to be accomplished irrespective of which interchanger is being defrosted and which is cooling the compressed air.

Orifice plates 58, 59, and 60 in the connections to manifold 61 proportion the compressed air to the two or more interchangers in parallel in accordance with the cooling effects of the returning product of rectification. The returning product of rectification becomes distributed among the several interchangers in parallel in accordance with frictional resistances to flow therethrough, and there is no change in the distribution during operation by reason of absence of any tendency of the returning product to deposit obstructions to flow upon the heating surfaces. With the compressed air, however, relatively low pressure drops when the interchangers are clean do not provide a sufficiently positive distribution, and as operation continues, deposits occur to change the distribution. Orifices or other fixed restrictions to flow in the connections between manifold 61 and the several interchangers are therefore provided in order to attain a substantial proportioning of the flows of compressed air to the cooling effects of the returning product of rectification through the several interchangers.

This arrangement of interchangers would, of course, be useful where interchangers only are used in an air separation plant and also where both products of rectification are returned through each interchanger. Manifold 61 and connections to both ends of each regenerator would be useful for recuperators as well as for interchangers in permitting each recuperator in turn to be warmed up to atmospheric temperature for re-evaporating all impurities therein which accumulate over a number of cycle of operation. The word "regenerator" is therefore used in the claims pertaining to this feature in order to include recuperators as well as interchangers.

Referring to Fig. 1, the two portions of compressed air cooled in the two sets of recuperators N and O, flow through pipes 62 and 63 respectively and then commingle to flow through pipe 64 to interchanger K. Within interchanger K, the commingled portions of compressed air are further cooled as explained later and leave through pipe 65 to liquefier L. Within liquefier L, the compressed air is partly liquefied by heat transfer to returning products of rectification. The partly liquefied air then flows through pipe 66 to preliminary rectifier P.

Within preliminary rectifier P, the compressed air is separated by a preliminary rectification into an oxygen-rich liquid which accumulates in the bottom thereof and a nitrogen-rich vapor which enters tubes 87 at the top thereof. Partial condensation of this nitrogen-rich vapor provides the necessary reflux liquid for the preliminary rectification. The remaining vapor leaves through pipe 67 and flows down through tubes 88 within auxiliary vaporizer Q. Within tubes 88, a large part of the remaining vapor is liquefied and accumulates in the bottom of auxiliary vaporizer Q.

The remaining uncondensed vapor leaves through pipe 68 and thence flows through interchanger K where it is warmed in cooling the compressed air flowing therethrough as described above. The superheated nitrogen-rich vapor containing highly volatile gases which would otherwise tend to accumulate within the system then flows through pipe 69 to expansion engine E. Here the nitrogen-rich superheated vapor is expanded and its temperature reduced by performance of external work. This external work is recovered as described and claimed in patent application Serial No. 35,351, filed August 8, 1935.

From preliminary rectifier P and auxiliary vaporizer Q, the liquids mentioned flow through pipes 70 and 71 to main rectifier R. Here these liquids are rectified into more or less pure oxygen and nitrogen. The oxygen flows as a liquid through pipe 72 to the space surrounding tubes 87 in preliminary rectifier P where it is partly vaporized by heat transfer from the nitrogen-rich vapor within these tubes under a higher pressure. The remaining liquid flows through pipe and valve 73 to the space surrounding tubes 88 within auxiliary vaporizer Q where vaporization is completed.

Part of the vaporized liquid leaves auxiliary vaporizer Q through pipe 74 as the oxygen product of rectification and returns through liquefier L and recuperators O. The remaining vaporized liquid from auxiliary vaporizer Q flows through pipe 75 and joins the vaporized liquid leaving preliminary rectifier P through pipe 76. Entering main rectifier R through pipe 77, this vaporized liquid serves as the vapor reflux in the main rectifier.

The nitrogen product of rectification leaves main rectifier R through pipe 78 and joins the expanded nitrogen-rich vapor leaving expansion engine E through pipe 79. The two nitrogen vapor streams join and flow together through pipe 80 to liquefier L. Within liquefier L, the nitrogen and oxygen products of rectification and the expanded vapor from engine E are warmed by heat transfer from the compressed air which is partly liquefied therein. The nitrogen product of rectification together with the expanded vapor then return through nitrogen recuperators N.

The arrangement of liquefier L, preliminary rectifier P, auxiliary vaporizer Q and main rectifier R in Fig. 2 is similar to that in Fig. 1. There is provided, however, interchanger F instead of interchanger K, and the vapor expanded in engine E is not drawn from auxiliary vaporizer Q. In Fig. 2, compressed air from oxygen interchangers O flows through pipe 81 to expansion engine E where it is expanded and then discharged through pipe 82, interchanger F and pipe 83 into main rectifier R. The purpose of interchanger F is to cool the expanded vapor substantially to the temperature of rectification by means of the nitrogen product of rectification flowing through pipe 78 from main rectifier R. The nitrogen product of rectification then flows through pipe 84 to liquefier L.

Absorption tower T is provided to remove carbon dioxide from the portion of compressed air which flows to expansion engine E from regenerators O, thereby reducing if not eliminating difficulties due to deposition of carbon dioxide within the expansion engine or turbine.

The arrangement of main and auxiliary rectifiers in both Fig. 1 and Fig. 2 and the co-ordination of the expansion engine in operation therewith are essentially as described and claimed in patent application Serial No. 9,186 filed March 4, 1935. The operation of the apparatus will now be explained.

During normal operation, compressed air is supplied at substantially constant pressure through main 1. A measured quantity of this compressed air is withdrawn by positive displacement compressors C and D in Fig. 1 or by positive displacement compressor C only in Fig. 2. In Fig. 2, a measured portion of the compressed air from compressor C is drawn through carbon dioxide absorption tower T by compressor D.

In either case, two separate measured portions of compressed air are supplied to the two sets of regenerators N and O for warming respectively the returning nitrogen and oxygen products of rectification. So far as possible, the design proportions of compressors C and D are such as to supply compressed air to be cooled in proportion to the cooling effects of the returning nitrogen and oxygen. Should temperature measurements show, however, that the two portions of compressed air are not cooled to the desired extents, valves 6 and 7 controlling clearance pockets in the two compressors may be adjusted until the desired results are attained.

In Fig. 1, it will be desired to cool both portions of compressed air to approximately the same temperature before they commingle and enter interchanger K. In Fig. 2, it may be desired to have the portion of compressed air flowing to expansion engine E at a different temperature than that of the other portion flowing to liquefier L.

The valves on recuperators N will be operated individually or by the central control valve 31 in Fig. 3 so as to have one portion of the compressed air flowing up through one of the recuperators while nitrogen flows down through the remaining recuperators (except for a short period when one of the recuperators is being changed over to or from compressed air). With automatic control valve 31 in operation and four recuperators in use, compressed air will always be flowing through one recuperator while nitrogen is returning through two or three recuperators. The passages within valve 31 for the control fluid will be such that with nitrogen returning through three recuperators, one of these will have the nitrogen flow shut off, the pressure therein built up and the flow of compressed air started therethrough before the flow of compressed air is shut off through the fourth recuperator. There will therefore be no interruption to flow of either the compressed air or the returning product of rectification.

Oxygen recuperators O in Fig. 1 will be operated in the same manner as described above for nitrogen recuperators N. In fact, both sets of recuperators may be automatically operated by the same control valve.

If interchangers are used as regenerators as in Fig. 2, the compressed air will flow up through one interchanger to thaw out accumulated moisture and then flow up through the remaining interchangers in parallel. A control system can be used for the valves on the several interchangers similar to that described for recuperators, except that the system would be simpler due to it being unnecessary to gradually change any pressures.

With two sets of regenerators functioning as above described to cool two measured portions of compressed air by heat exchange with returning oxygen and nitrogen respectively, cooled compressed air will flow through interchanger K and liquefier L to preliminary rectifier P and auxiliary vaporizer Q where liquids will collect as indicated. The levels of these liquids are maintained constant during normal operation by manual or automatic control of valves 85 and 86. Expansion engine E is so proportioned to compressors C and D that when running at the same speed or a fixed ratio thereto, just the right amount of refrigeration is furnished to balance heat leak and other thermodynamic losses with a given liquid level surrounding tubes 87 and 88 in the upper part of preliminary rectifier P and auxiliary vaporizer Q. There will then be a certain high pressure within preliminary rectifier P and auxiliary vaporizer Q corresponding to a given low pressure within final rectifier R. These two pressures of rectifaction will be such that the required heat transfer will take place through the surfaces of tubes 87 and 88 to vaporize all liquid flowing from main rectifier R.

Should any change in operating conditions destroy the balance between refrigeration furnished and refrigeration required, there will be an increase or decrease in the quantity of liquids within the system. With the liquid levels maintained constant in the bottoms of preliminary rectifier P and auxiliary vaporizer Q, there will be a change in the liquid level surrounding tubes 87 and 88 in the upper parts of these pieces of equipment. For example, should there be a deficiency in refrigeration supplied, as compared with that required, the liquid level will drop. With less wetted heat transfer surface, a greater temperature difference will be required to transfer approximately the same amount of heat. Consequently, the pressure in preliminary rectifier P and auxiliary vaporizer Q will rise.

With the arrangement in Fig. 1, a corresponding increase will occur in the initial pressure to expansion engine E. More vapor will therefore be expanded through engine E, thereby increasing the refrigeration supplied. A balance will automatically be reached eventually between refrigeration supplied and refrigeration required at a somewhat lower liquid level surrounding tubes 87 and 88.

The same balance between refrigeration supplied and refrigeration required will be automatically reached by the arrangement shown in Fig. 2 with variation of liquid level surrounding tubes 87 and 88. Thus, should the liquid level fall, the pressure within preliminary rectifier P will rise. This will result in an increased pressure in pipe 4 from compressor C. With a higher suction pressure, compressor D with the same displacement will withdraw a greater mass of gas and supply this greater mass to expansion engine E. The initial pressure will rise and more external work will be done, thereby increasing the supply of refrigeration to the plant until a balance is eventually reached with a somewhat lower liquid level.

With the piston in expansion engine cylinder E connected by a connecting rod to a crank on the same shaft as the cranks connected by connecting rods to the two pistons within compressor cylinders C and D, the positive displacements of the engine and both compressors will remain in the same proportion irrespective of the speed of motor M; and the external work of engine E will be recovered in driving compressors C and D. In addition to compressors C and D having each a positive displacement per revolution, they must be mechanically or otherwise connected to run at the same rotative speed or in a fixed speed ratio, in order that the portions of compressed air supplied by them to the air separation plant shall be in a fixed and predetermined ratio.

I claim:

1. Method of separating air by rectification which includes compressing said air, withdrawing a measured quantity of said compressed air, further compressing a portion of said quantity, expanding the further compressed air with performance of external work, subjecting the remaining portion of the quantity withdrawn to a preliminary rectification, and subsequently rectifying both portions.

2. Method of separating mixed gases by rectification which includes cooling a portion of said mixed gases at high pressure by warming a returning product of rectification, rectifying the cooled mixed gases at said high pressure, compressing another portion of said mixed gases before cooling from said high pressure to a higher pressure, cooling the compressed portion of said mixed gases by warming a returning product of rectification, expanding the cooled compressed portion to a low pressure, and rectifying both portions at said low pressure.

3. Method of separating mixed gases by rectification which includes compressing a quantity of said mixed gases, further compressing a measured portion of said quantity, cooling the further compressed portion by warming a product of rectification, expanding the further compressed and cooled portion with performance of external work, cooling the remaining portion of said quantity by warming a returning product of rectification, subjecting the cooled remaining portion to a preliminary rectification, and subsequently rectifying both portions of said mixed gases.

4. Method of separating mixed gases by cooling and rectification which includes cooling one portion of said mixed gases by heat transfer to a returning product of rectification, expanding said portion with performance of external work, cooling another portion of said mixed gases by heat transfer to material which has been previously cooled by a returning product of rectification and subsequently rectifying both portions of said mixed gases.

5. Method of separating mixed gases by rectification which includes compressing separate portions to different pressures, expanding one portion with performance of external work, subjecting another portion to a preliminary rectification, subsequently rectifying both portions, chemically removing carbon dioxide from the portion to be expanded, and rectifying the other portion without removing carbon dioxide therefrom.

6. Method of separating mixed gases by rectification which includes alternately warming and cooling a material capable of absorbing and giving up heat by passing over said material a portion only of said mixed gases until said material is warmed through a certain temperature range and then passing over said material one of the products of rectification at a lower mass velocity until said material is cooled through the same temperature range.

7. Method of separating mixed gases by rectification which includes alternately passing over material capable of absorbing and giving up heat, a portion of said mixed gases for a given period of time and one of the products of rectification for a longer period of time.

8. Method of separating mixed gases by rectification which includes flowing a portion of said mixed gases over a mass of material capable of absorbing and giving up heat, flowing a product of rectification in multiple portions in parallel over additional masses of similar material, stopping the flow of one of the multiple portions over one of the additional masses of material, flowing part of said portion of the mixed gases over said one of the additional masses of material, stopping the flow of the remainder of said portion of the mixed gases over the first mentioned mass of material, and flowing a portion of said product of rectification over the first mentioned mass of material, whereby the flow of said portion of the mixed gases and the flow of said product of rectification are not completely interrupted in changing the flows over the masses of material heated and cooled.

9. Apparatus for separating mixed gases by cooling and rectification including regenerators for cooling separate portions of said mixed gases and positive displacement means driven in synchronism for supplying said separate portions to said regenerators in a predetermined ratio, whereby said predetermined ratio is maintained constant irrespective of differences in frictional resistances through said regenerators.

10. Apparatus for separating atmospheric air by cooling and rectification including a compressed air main for supplying compressed atmospheric air, regenerators for cooling separate portions of said atmospheric air and compressors for withdrawing measured portions in a predetermined ratio of atmospheric air from said compressed air main and supplying the separate portions to said regenerators.

11. Apparatus for separating atmospheric air by cooling and rectification as in claim 10 including means for changing the ratio of the portions of air supplied to said regenerators.

12. Apparatus for separating mixed gases by cooling and rectification including three or more recuperators, means for passing a portion of said mixed gases through one recuperator and means for returning one of the products of rectification through the remaining recuperators in parallel.

13. Apparatus for separating mixed gases by cooling and rectification as in claim 12, including means for replacing the recuperator through which said mixed gases pass by one of said remaining recuperators.

14. Apparatus for rectifying a compressed gaseous mixture including a vessel, means for alternately passing said compressed gaseous mixture and a product of rectification through said vessel, means for discharging compressed gaseous mixture from said vessel before passing said product therethrough, and means for separating from said product the compressed gaseous mixture discharged, whereby the contamination of said product by said gaseous mixture is reduced.

15. Apparatus for rectifying a compressed gaseous mixture as in claim 14 including means for flushing said gaseous mixture out of said vessel before recovering said product therefrom.

16. Apparatus for rectifying a compressed gaseous mixture including a vessel, valves for controlling flow of a product of rectification through said vessel, an auxiliary valve for discharging gases from said vessel and means for automatically closing said auxiliary valve when one of said controlling valves opens.

17. Apparatus for separating mixed gases by cooling and rectification including multiple regenerators for cooling said mixed gases and for warming a returning product of rectification, means for supplying said mixed gases to the lower end of one of said regenerators, means for withdrawing said mixed gases from the upper end of said regenerator, a manifold for distributing the withdrawn mixed gases to the lower ends of two or more remaining regenerators, and means for withdrawing said mixed gases from the upper ends of said remaining regenerators.

18. Apparatus for separating mixed gases by cooling and rectification as in claim 17 including restrictions in the connections from said manifold to said multiple regenerators for proportioning the flows of mixed gases to said regenerators.

19. Apparatus for separating mixed gases by cooling and rectification as in claim 17 including means for replacing the regenerator through which the mixed gases first flow by one of the remaining regenerators.

20. Apparatus for separating mixed gases by rectification including positive displacement means driven in synchronism for dividing said mixed gases into two portions, means for expanding one portion with performance of external work, means for subjecting the other portion to a preliminary rectification, and means for subsequently rectifying both portions.

21. Apparatus for separating mixed gases by rectification including a positive displacement compressor for compressing said mixed gases, a second positive displacement compressor for further compressing a portion of said mixed gases, means for driving the two compressors in synchronism, means for expanding said portion with performance of external work, a preliminary rectifier for subjecting another portion of said compressed mixed gases to a preliminary rectification, and a main rectifier for subsequently rectifying both portions.

22. Apparatus for separating compressed mixed gases by rectification as in claim 21 including a regenerator of the interchanger type for cooling the portion expanded and a regenerator of the recuperator type for cooling the portion subjected to a preliminary rectification.

23. Apparatus for separating compressed mixed gases by rectification as in claim 21 including heat transfer surface between liquid from said main rectifier and vapor from said preliminary rectifier whereby a fall in liquid level increases said external work and vice versa.

24. Apparatus for separating mixed gases by rectification including a preliminary rectifier for subjecting said mixed gases to a preliminary rectification, a main rectifier for subsequently completing the rectification, a vaporizer for vaporizing a portion of liquid from said main rectifier by liquefying a portion of vapor from said preliminary rectifier, an auxiliary vaporizer for completing the vaporization of said liquid by liquefying another portion of said vapor, and means for expanding with performance of external work the remainder of said vapor.

25. Apparatus for separating mixed gases by rectification as in claim 24 including an interchanger for warming by heat exchange with said mixed gases the remainder of said vapor before expansion.

26. Apparatus for separating mixed gases by rectification including positive displacement compressors for compressing said mixed gases and for dividing said mixed gases into measured portions, and means for driving said compressors at a constant speed ratio whereby measured portions of said mixed gases are supplied for rectification in a predetermined ratio.

27. Apparatus for separating mixed gases by rectification as in claim 26 including an expander for expanding one portion of said mixed gases before or after rectification and means for operating said expander at a constant speed ratio to said compressors.

WILLIAM LANE DE BAUFRE.